United States Patent
Shadman et al.

(10) Patent No.: US 7,555,951 B2
(45) Date of Patent: Jul. 7, 2009

(54) DETERMINATION OF REMAINING USEFUL LIFE OF GAS TURBINE BLADE

(75) Inventors: Andleeb Shadman, Bangalore (IN);
Rafeek Sainudeen, Bangalore (IN);
Sundararajan Viswanathan, Bangalore (IN); Ranjan Ganguli, Bangalore (IN);
Hasham H. Chougule, Mumbai (IN)

(73) Assignee: Honeywell International Inc., Morristown, NJ (US)

( * ) Notice: Subject to any disclaimer, the term of this patent is extended or adjusted under 35 U.S.C. 154(b) by 440 days.

(21) Appl. No.: 11/439,546

(22) Filed: May 24, 2006

(65) Prior Publication Data
US 2007/0272018 A1 Nov. 29, 2007

(51) Int. Cl.
*G01N 29/036* (2006.01)
*G01N 29/46* (2006.01)

(52) U.S. Cl. .............. 73/579; 73/593; 73/659; 73/660

(58) Field of Classification Search ........... 73/579, 73/602, 593, 659, 660, 662, 786, 799; 702/34–36, 702/56
See application file for complete search history.

(56) References Cited

U.S. PATENT DOCUMENTS

| | | | |
|---|---|---|---|
| 3,908,447 A | 9/1975 | Salt | |
| 4,080,823 A | 3/1978 | Stargardter | |
| 5,058,434 A * | 10/1991 | Zaschel | 73/659 |
| 5,327,358 A * | 7/1994 | Stubbs | 702/36 |
| 5,445,027 A * | 8/1995 | Zorner | 73/593 |
| 5,455,777 A * | 10/1995 | Fujiyama et al. | 702/34 |
| 5,552,711 A | 9/1996 | Deegan et al. | |
| 5,942,690 A * | 8/1999 | Shvetsky | 73/660 |
| 6,098,022 A | 8/2000 | Sonnichsen et al. | |
| 6,370,957 B1 * | 4/2002 | Filippenko et al. | 73/660 |
| 6,694,285 B1 * | 2/2004 | Choe et al. | 702/182 |
| 6,802,221 B2 * | 10/2004 | Hedeen et al. | 73/587 |
| 7,039,557 B2 * | 5/2006 | Mayer et al. | 702/184 |
| 7,062,971 B2 * | 6/2006 | Harrold et al. | 73/593 |
| 7,233,886 B2 * | 6/2007 | Wegerich et al. | 703/2 |

(Continued)

FOREIGN PATENT DOCUMENTS

WO    WO 91/19173 A1    12/1991

(Continued)

OTHER PUBLICATIONS

L. Marinai et al., "Prospects for aero gas-turbine diagnostics: a review," Applied Energy 79 (2004), pp. 109-126.

(Continued)

*Primary Examiner*—Hezron Williams
*Assistant Examiner*—J M Saint Surin
(74) *Attorney, Agent, or Firm*—Schiff Hardin LLP

(57) ABSTRACT

A system may be used to indicate a need for replacement of a vibrating structure and includes a sensor, an indicator, and a processor. The sensor senses a frequency of vibration of the vibrating structure. The indicator is controlled to provide an indication of the need for replacement of the vibrating structure. The processor compares the frequency of vibration of the vibrating structure to data that relates the vibration frequency of the vibrating structure to fatigue damage of the vibrating structure, and controls the indicator based on the comparison.

20 Claims, 4 Drawing Sheets

U.S. PATENT DOCUMENTS

| | | | |
|---|---|---|---|
| 7,243,042 B2* | 7/2007 | Plotts et al. | 702/136 |
| 2002/0162394 A1 | 11/2002 | Loftus et al. | |
| 2003/0007861 A1 | 1/2003 | Brooks et al. | |
| 2003/0122682 A1 | 7/2003 | Gass et al. | |
| 2004/0076523 A1 | 4/2004 | Sinha et al. | |

FOREIGN PATENT DOCUMENTS

| | | | |
|---|---|---|---|
| WO | WO 03/021233 A1 | 3/2003 | |

OTHER PUBLICATIONS

A. Fatemi et al., "Cumulative fatigue damage and life prediction theories: a survey of the state of the art for homogeneous materials," Intl. Journal of Fatigue 20, (1) (1998) pp. 9-34.

J.L. Chaboche, "Continuum damage mechanics: Present State and Future Trends," Nuclear Engineering and Design, 105 (1987) pp. 19-33.

X. Yang et al., "A continuous low cycle fatigue damage model and its application in engineering materials," International Journal of Fatigue, vol. 19, No. 10, 1997, pp. 687-692.

J. Hou et al., "An investigation of fatigue failures of turbine blades in a gas turbine engine by mechanical analysis," Engineering Failure Analysis 9 (2002) pp. 201-211.

D. Kujawski et al., "A cumulative damage theory for fatigue crack initiation and propagation," International Journal of Fatigue, vol. 6, No. 2, Apr. 1984, pp. 83-88.

A.J.A. Mom et al., "Turbistan, A Standard Load Sequence for Aircraft Engine Discs," Nationaal Lucht- En Ruimtevaartlaboratorium, National Aerospace NLR, 1985, 15 pp.

B.W. Hayes et al., "Application of Generation 4 Non-contact Stress Measurement Systems on HCF Demonstrator Engines," 9th National Turbine Engine High Cycle Fatigue (HCF) conference, Mar. 2004.

H.H. Mabie et al., "Transverse Vibrations of Double-Tapered Cantilever Beams," The Journal of the Acoustical Society of America, 1972, pp. 1771-1774.

K.K. Kapur, "Vibrations of a Timoshenko Beam, Using Finite-Element Approach," The Journal of the Acoustical Society of America, 1966, pp. 1058-1063.

S.S. Rao et al., "Finite Element Vibration Analysis of Rotating Timoshenko Beams," Journal of Sound and Vibration (2001), pp. 103-124.

I. Takahashi, "Vibration and stability of non-uniform cracked Timoshenko beam subjected to follower force," Computers and Structures 71 (1999) pp. 585-591.

M.S. Lebold et al., "Using Torsional Vibration Analysis as a Synergistic Method for Crack Detection in Rotating Equipment," IEEE Aerospace Conference, 2004, pp. 1-12.

B. Yildiz et al., "Development of a Hybrid Intelligent System for On-Line Monitoring of Nuclear Power Plant Operations," PSAM 6 Conference, 2002, 8 pp.

G.J. Kacprzynski et al., "Enhancing Gear Physics-Of-Failure Models With System Level Vibration Features," Proceedings of the 56th Meeting of the Society for Machinery Failure Prevention Technology, Apr. 15-19, 2002, 13 pp.

G.J. Kacprzynski et al., "Enhancement of physics-of-failure prognostic models with system level features," IEEE Aerospace Conference, Mar. 1-16, 2002, 9 pp.

K. Maynard et al., "Gas Turbine Blade and Disk Crack Detection Using Torsional Vibration Monitoring: A Feasibility Study," Proceedings of 14th International Congress and Exhibition on Condition Monitoring And Diagnostic Engineering Management (COMADEM), Sep. 2001, 8 pp.

D. Chelidze et al., "A Dynamical Systems Approach to Damage Evolution Tracking, Part 1: Description and Experimental Application," Journal of Vibration and Acoustics, Transactions of the ASME Apr. 2002, ppp. 250-257.

J.P. Cusumano et al., "A Dynamical Systems Approach to Damage Evolution Tracking, Part 2: Model-Based Validation and Physical Interpretation," Journal of Vibration and Acoustics, Transactions of the ASME, Apr. 2002, pp. 258-264.

Z. Hashin et al., "A Cumulative Damage Theory of Fatigue Failure," Materials Science and Engineering, 37 (1978), pp. 147-160.

J.B. De Jonge, "The Analysis of Load-Time Histories by Means of Counting Methods," Nationaal Lucht- En Ruimtevaartlaboratorium, National Aerospace NLR, 1982.

K. Maynard et al., "Blade and Shaft Crack Detection Using Torsional Vibration Measurements Part 3: Field Application Demonstrations," Noise and Vibration Worldwide 32 (11), 17 pp., Dec. 2001.

* cited by examiner

| N/Nf | 0 | 0.2 | 0.4 | 0.6 | 0.8 | 0.9 | 0.97 |
|------|---|-----|-----|-----|-----|-----|------|
| $\omega$ | $\omega_0$ | $\omega_1$ | $\omega_2$ | $\omega_3$ | $\omega_4$ | $\omega_5$ | $\omega_6$ |

DETERMINATION OF REMAINING USEFUL LIFE OF GAS TURBINE BLADE

TECHNICAL FIELD OF THE INVENTION

The present invention relates to a method and/or system for the determination of the remaining useful life of a turbine blade such as a gas and/or a steam turbine blade.

BACKGROUND OF THE INVENTION

Gas turbine blades are generally subjected to variable speeds and loading. The variable loading on the gas turbine blades are mainly caused by fluid jets impacting the gas turbine blades and the starting and shutting down of the gas turbine itself. This variable loading causes variable mean stresses and variable alternating stresses on the gas turbine blades. The variations of these stresses subjects the gas turbine blades to mechanical forces such as fatigue, creep, thermo mechanical fatigue, etc. Fatigue, for example, causes a turbine blade to fail at a stress that is much less than the turbine blade can withstand when it is new.

Many studies have attempted to deal with the problem of turbine blade failure. For example, some studies have attempted to determine the basic fatigue properties of the material of the turbine blade and of the turbine blade design for which the material is being used. Fatigue tests have been conducted in an effort to determine variations in the stress intensity factor over time and to relate these variations to crack nucleation. Some studies have modeled turbine blades as rotating Timoshenko beams with twists and tapers. Also, some studies have addressed damage in such beams using vibration characteristics.

However, these studies typically have addressed damage at a given point in time during the operational history of the turbine blade and have not looked at the effect of damage growth on the vibration characteristics. Turbine blades undergo cyclic loading. This loading is time dependent and causes deterioration of the turbine blades. To avoid catastrophic failures of the turbine blades, the amount of damage as a function of time should also be determined and used to predict the remaining useful life of the turbine blade so that it can be optimally replaced before failure.

SUMMARY OF THE INVENTION

According to one aspect of the present invention, a system for indicating a need for replacement of a vibrating structure comprises a sensor, an indicator, and a processor. The sensor is arranged to sense a frequency of vibration of the vibrating structure. The indicator is controlled to provide an indication of the need for replacement of the vibrating structure. The processor compares the frequency of vibration of the vibrating structure to data that relates the vibration frequency of the vibrating structure to fatigue damage of the vibrating structure, and controls the indicator based on the comparison.

According to another aspect of the present invention, a method comprises the following: generating a model of a vibrating structure; generating a fatigue damage model for the vibrating structure; modifying the model of the vibrating structure based on the fatigue damage model; determining from the modified model at least one frequency of vibration that corresponds to a predetermined amount of fatigue damage; and, storing the at least one frequency of vibration in a memory of a system to be used to provide a notification of when the vibrating structure should be replaced.

According to still another aspect of the present invention, a computer implemented method comprises the following: generating a model of a vibrating structure; generating a fatigue damage model for the vibrating structure; modifying the model of the vibrating structure based on the fatigue damage model; and, determining from the modified model at least one frequency of vibration that corresponds to a predetermined amount of fatigue damage.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
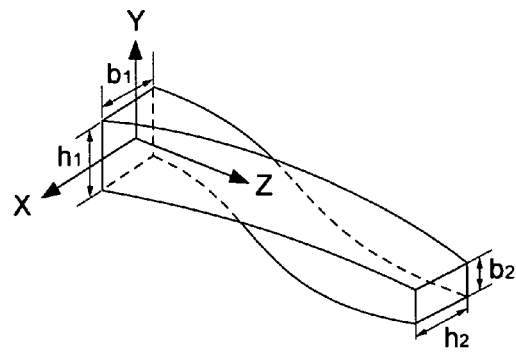
FIG. 1a shows a doubly tapered, twisted beam element of length l with nodes 1 and 2.
FIG. 1b shows the nodal degrees of freedom of the beam element of FIG. 1a where bending direction, bending slope, shear deflections, and shear slope in two planes are the nodal degrees of freedom.
FIG. 1c illustrates the angle of twist $\theta$.
FIG. 1d illustrates rotation of the beam element.
Figure 1:
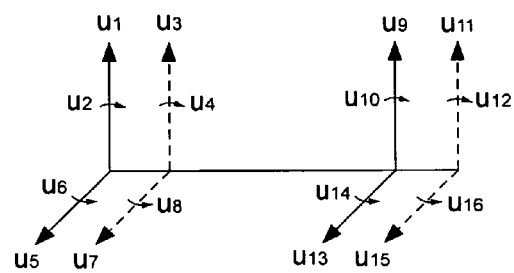
Figure 1:
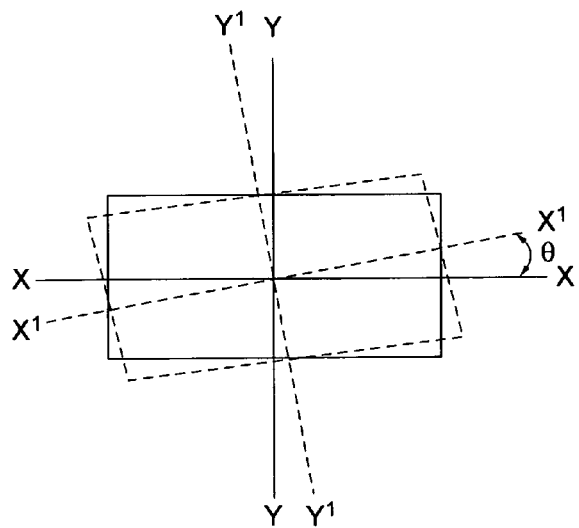
Figure 1:
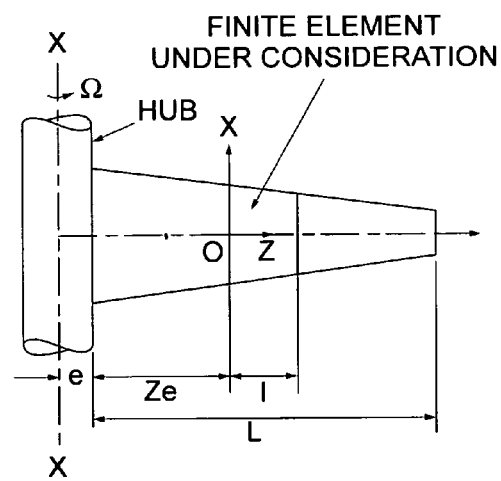

Fatigue is a phenomenon in which repetitive loads cause a structure to fail at a stress level that is much lower than the stress level that the structure can withstand when it is new and unused. The principal contributing factors to fatigue failure are the number of load cycles experienced by the structure and the presence of local stress concentrations. Fatigue cracks result from plastic deformation, which in turn results from initiation and propagation of a crack. Low cycle fatigue is associated with large stresses causing considerable plastic deformation with failure cycles $N_f$ in the range of $10^2$ to $10^4$.

The Table defines certain parameters, variables, and constants used in the analysis presented herein.

| | |
|---|---|
| A | Area of cross section |
| b | Breadth of beam |
| D | Damage variable |
| $D_0$ | Initial damage |
| e | Offset |
| E | Young's modulus |
| $E_0$ | Young's modulus for undamaged material |
| g | acceleration due to gravity |
| G | Shear modulus |
| h | Depth of beam |
| $I_{xx}$ | moment of inertia of beam cross section about xx axis |
| $I_{yy}$ | moment of inertia of beam cross section about yy axis |
| $I_{zz}$ | moment of inertia of beam cross section about zz axis |
| K | material constant |
| $K_c$ | material parameter |
| [K] | element stiffness matrix |

-continued

| | |
|---|---|
| l | length of an element |
| L | length of total beam |
| M | material constant |
| $M_c$ | material parameter |
| [M] | element mass matrix |
| N | number of cycles |
| $N_f$ | number of cycles to produce fatigue failure |
| p | plastic strain |
| $\dot{p}$ | rate of accumulation of plastic strain |
| $R_v$ | stress triaxiality factor |
| r(t) | residual frequency |
| $S_0$ | temperature dependent material constant |
| $S_{ij}$ | stress deviator |
| T | temperature, threshold residual frequency, Kinetic energy of the element |
| t | time parameter |
| u | nodal degrees of freedom |
| U | strain energy |
| v | displacement in xz plane |
| w | displacement in yz plane |
| x, y | coordinate axes |
| Y | damage strain energy release rate |
| z | coordinate axis and length parameter |
| $z_e$ | distance of the first node of the element from the root of the beam |
| $\alpha$ | depth taper ratio h1/h2 |
| $\beta$ | breadth taper ratio b1/b2 |
| $\theta$ | angle of twist |
| $\rho$ | weight density |
| $\mu$ | shear coefficient |
| $\nu$ | Poisson's ratio |
| $\psi$ | potential function |
| $\psi_c$ | elastic potential function |
| $\epsilon^e$ | elastic strain tensor |
| $\Delta\epsilon$ | strain range |
| $\pi$ | micro plasticity accumulated strain |
| $\sigma_{ij}$ | stress level |
| $\Delta\sigma$ | stress range |
| $\sigma_{eq}$ | Von Mises stress |
| $\sigma_H$ | hydrostatic stress |
| $\sigma_Y$ | initial yield stress |
| $\phi$ | Dissipated potential |
| $\phi_P$ | Von Mises plasticity function |
| $\phi_D$ | Damage dissipated potential |
| $\phi_\pi$ | microplastical dissipation potential |
| $\lambda$ | proportion factor |
| $\Delta\omega$ | residual frequency |
| $\Omega$ | rotational speed of the beam (rad/s) |

In addition, the frequency ratio is the ratio of the modal frequency to the frequency of the fundamental mode of a uniform beam with the same root cross-section and without shear deformation effects, the subscript b denotes bending, and the subscript s denotes shear.

FIG. 1a shows a doubly tapered, twisted beam element 10 of length l with two nodal points 1 and 2. The breadth b, depth h, and the twist of the beam element are assumed to be linearly varying along its length. The breadth and depth at the two nodal points are shown as $b_1$, $h_1$ and $b_2$, $h_2$, respectfully. The pre-twist at the two nodal points are denoted $\theta_1$ and $\theta_2$.

FIG. 1b shows the nodal degrees of freedom of the beam element 10 of FIG. 1a where bending direction, bending slope, shear deflections, and shear slope in two planes are the nodal degrees of freedom. The total deflections and shear slope in the two planes at the two nodal points are taken as nodal degrees of freedom. The total deflections of the beam element 10 in the y and x directions at a distance z from the node are denoted as w(z) and v(z) and are given by the following equations:

$$w(z) = w_b(z) + w_s(z) \tag{1}$$

$$v(z) = v_b(z) + v_s(z) \tag{2}$$

where $w_b(z)$ and $v_b(z)$ are the deflections due to bending in the yz and xz planes, respectively, and $w_s(z)$ and $v_s(z)$ are the deflections due to shear in the corresponding planes. The displacement models for $w_b(z)$, $w_s(z)$, $v_b(z)$, and $v_s(z)$ are assumed to be polynomial equations of the third degree. These polynomials are similar in nature and differ only with respect to the nodal constants. These polynomial equations are given as follows:

$$w_b(z) = \frac{u_1}{l^3}(2z^3 - 3lz^2 + l^3) + \frac{u_9}{l^3}(3lz^2 - 2z^3) + \frac{u_2}{l^2}(z^3 - 2lz^2 + l^2z) + \frac{u_{10}}{l^2}(z^3 - lz^2) \tag{3}$$

$$w_s(z) = \frac{u_3}{l^3}(2z^3 - 3lz^2 + l^3) + \frac{u_{11}}{l^3}(3lz^2 - 2z^3) + \frac{u_4}{l^2}(z^3 - 2lz^2 + l^2z) + \frac{u_{12}}{l^2}(z^3 - lz^2) \tag{4}$$

$$v_b(z) = \frac{u_5}{l^3}(2z^3 - 3lz^2 + l^3) + \frac{u_{13}}{l^3}(3lz^2 - 2z^3) + \frac{u_6}{l^2}(z^3 - 2lz^2 + l^2z) + \frac{u_{14}}{l^2}(z^3 - lz^2) \tag{5}$$

$$v_s(z) = \frac{u_7}{l^3}(2z^3 - 3lz^2 + l^3) + \frac{u_{15}}{l^3}(3lz^2 - 2z^3) + \frac{u_8}{l^2}(z^3 - 2lz^2 + l^2z) + \frac{u_{16}}{l^2}(z^3 - lz^2) \tag{6}$$

where $u_1$, $u_2$, $u_9$, and $u_{10}$ represent the bending degrees of freedom in the yz plane, $u_3$, $u_4$, $u_{11}$, and $u_{12}$ represent the shear degrees of freedom in the yz plane, $u_5$, $u_6$, $u_{13}$, and $u_{14}$ represent the bending degrees of freedom in the xz plane, and $u_7$, $u_8$, $u_{15}$, and $u_{16}$ represent the shear degrees of freedom in the xz plane.

The total strain energy U of the beam element 10 of length l due to bending and shear deformation including rotary inertia and rotation effects is given by the following equation:

$$U = \int_0^l \left[ \left\{ \frac{EI_{xx}}{2}\left(\frac{\partial^2 w_b}{\partial z^2}\right)^2 + EI_{xy}\frac{\partial^2 w_b}{\partial z^2}\frac{\partial^2 v_b}{\partial z^2} + \frac{EI_{yy}}{2}\left(\frac{\partial^2 v_b}{\partial z^2}\right)^2 \right\} + \frac{\mu AG}{2}\left\{\left(\frac{\partial w_s}{\partial z}\right)^2 + \left(\frac{\partial v_s}{\partial z}\right)^2\right\} \right] dz + \frac{1}{2}\int_0^l P(z)\left(\frac{\partial w_b}{\partial z} + \frac{\partial w_s}{\partial z}\right)^2 dz + \frac{1}{2}\int_0^l P(z)\left(\frac{\partial v_b}{\partial z} + \frac{\partial v_s}{\partial z}\right)^2 dz - \int_0^l p_w(z)(w_b + w_s)dz - \int_0^l p_w(z)(v_b + v_s)dz \tag{7}$$

where P(z) is the axial force acting at section Z and $p_w(z)$ is the plastic strain along z axis.

In a first case where the beam element 10 is uniform such that $I_{xy}=0$, where shear and rotary inertia are ignored, and where deflection in only the yz plane is considered such that $v_b=v_s=0$, the total strain energy U is reduced to the following equation:

$$U = \int_0^l \frac{EI_{xx}}{2}\left(\frac{\partial^2 w_b}{\partial z^2}\right)^2 dz \tag{8}$$

The entries of the stiffness matrix [K] can be obtained by differentiating the above equation with respect to each degree of freedom and collecting the coefficients $u_1$, $u_2$, $u_9$, and $u_{10}$ in the above equation.

In a second case where the beam element 10 is uniform such that $I_{xy}=0$, where shear and rotary inertia are not ignored, and where deflection in only the yz plane is considered such that $v_b=v_s=0$, the total strain energy U is reduced to the following equation:

$$U = \int_0^l \left[ \frac{EI_{xx}}{2}\left(\frac{\partial^2 w_b}{\partial z^2}\right)^2 + \frac{\mu AG}{2}\left(\frac{\partial w_s}{\partial z}\right)^2 \right] dz \quad (9)$$

The stiffness matrix [K] in this case is of order 8 and can be derived by differentiating the above equation with respect to $u_i$ (i=1, 2, ..., 8) separately and collecting the coefficients $u_1, u_2, ..., u_8$.

In a third case, which is the general stiffness matrix case, the total strain energy U is reduced to the following equation:

$$U = \int_0^l \left[ \left\{ \frac{EI_{xx}}{2}\left(\frac{\partial^2 w_b}{\partial z^2}\right)^2 + EI_{xy}\frac{\partial^2 w_b}{\partial z^2}\frac{\partial^2 v_b}{\partial z^2} + \frac{EI_{yy}}{2}\left(\frac{\partial^2 v_b}{\partial z^2}\right)^2 \right\} + \frac{\mu AG}{2}\left\{ \left(\frac{\partial w_s}{\partial z}\right)^2 + \left(\frac{\partial v_s}{\partial z}\right)^2 \right\} \right] dz \quad (10)$$

The stiffness matrix [K] in this case is of order 16 and can be derived by differentiating the above equation with respect to $u_i$ (i=1, 2, ..., 16) separately and collecting the coefficients $u_1, u_2, ..., u_{16}$.

The Kinetic energy T of the beam element 10 including the effect of shear deformation and rotary inertia is given by the following equation:

$$T = \int_0^l \left[ \frac{\rho A}{2g}\left(\frac{\partial w_b}{\partial t} + \frac{\partial w_s}{\partial t}\right)^2 + \frac{\rho A}{2g}\left(\frac{\partial v_b}{\partial t} + \frac{\partial v_s}{\partial t}\right)^2 + \frac{\rho I_{yy}}{2g}\left(\frac{\partial^2 v_b}{\partial z \partial t}\right)^2 + \frac{\rho I_{xy}}{g}\left(\frac{\partial^2 w_b}{\partial z \partial t}\right)\left(\frac{\partial^2 v_b}{\partial z \partial t}\right) + \frac{\rho I_{xx}}{2g}\left(\frac{\partial^2 w_b}{\partial z \partial t}\right)^2 \right] dz \quad (11)$$

In a first case where the beam element 10 is uniform such that $I_{xy}=0$, where shear and rotary inertia are ignored, and where deflection in only the yz plane is considered such that $v_b=v_s=0$, the kinetic energy T is reduced to the following equation:

$$T = \int_0^l \frac{\rho A}{2g}\left(\frac{\partial w_b}{\partial t}\right)^2 dz \quad (12)$$

The mass matrix [M] for this first case is of order 4 and can be obtained by differentiating the above equation with respect to $u_i$ (i=1, 2, ..., 4) separately and collecting the coefficients $u_1, u_2, ..., u_4$.

In a second case where the beam element 10 is uniform such that $I_{xy}=0$, where shear and rotary inertia are not ignored, and where deflection in only the yz plane is considered such that $v_b=v_s=0$, the kinetic energy T is reduced to the following equation:

$$T = \int_0^l \left[ \frac{\rho A}{2g}\left(\frac{\partial w_b}{\partial t} + \frac{\partial w_s}{\partial t}\right)^2 + \frac{\rho I_{xx}}{2g}\left(\frac{\partial^2 w_b}{\partial z \partial t}\right)^2 \right] dz \quad (13)$$

The mass matrix [M] in this second case is of order 8 and can be derived by differentiating the above equation with respect to $u_i$ (i=1, 2, ..., 8) separately and collecting the coefficients $u_1, u_2, ..., u_8$.

In a third case, which is the general mass matrix case, the kinetic energy T is reduced to the following equation:

$$T = \int_0^l \left[ \frac{\rho A}{2g}\left(\frac{\partial w_b}{\partial t} + \frac{\partial w_s}{\partial t}\right)^2 + \frac{\rho A}{2g}\left(\frac{\partial v_b}{\partial t} + \frac{\partial v_s}{\partial t}\right)^2 + \frac{\rho I_{yy}}{2g}\left(\frac{\partial^2 v_b}{\partial z \partial t}\right)^2 + \frac{\rho I_{xy}}{g}\left(\frac{\partial^2 w_b}{\partial z \partial t}\right)\left(\frac{\partial^2 v_b}{\partial z \partial t}\right) + \frac{\rho I_{xx}}{2g}\left(\frac{\partial^2 w_b}{\partial z \partial t}\right)^2 \right] dz \quad (14)$$

The mass matrix [M] in this third case is of order 16 and can be derived by differentiating the above equation with respect to $u_i$ (i=1, 2, ..., 16) separately and collecting the coefficients $u_1, u_2, ..., u_{16}$.

The following boundary conditions can be applied depending on the type of end conditions. In a first case where the end conditions are free end conditions, the following boundary conditions apply:

$$\frac{\partial w_s}{\partial z} = 0, \quad \frac{\partial v_s}{\partial z} = 0, \quad \frac{\partial^2 v_b}{\partial z^2} = 0, \quad \frac{\partial^2 w_b}{\partial z^2} = 0. \quad (15)$$

In a second case where the end conditions are clamped end conditions, the following boundary conditions apply:

$$w_s = 0, \, w_b = 0, \, v_s = 0, \, v_b = 0, \, \frac{\partial w_s}{\partial z} = 0, \, \frac{\partial v_s}{\partial z} = 0. \quad (16)$$

In a third case where the end conditions are hinged end conditions, the following boundary conditions apply:

$$w_s = 0, \, w_b = 0, \, v_s = 0, \, v_b = 0, \, \frac{\partial^2 v_b}{\partial z^2} = 0, \, \frac{\partial^2 w_b}{\partial z^2} = 0. \quad (17)$$

In the case of turbine blades, the second case of boundary conditions apply because the beam element 10 has a clamped end, i.e., the beam element 10 is a cantilever beam.

The vibration of an un-damped system of motion may be expressed in matrix form according to the following equation:

$$[M](\ddot{x}) + [K](x) = \{0\} \quad (18)$$

or in matrix form $$M(\ddot{x}) + K(x) = 0 \quad (19)$$

where M is the mass matrix and K is the stiffness matrix. These equations may be rewritten as follows:

$$M^{-1}M\ddot{X} + M^{-1}KX = 0$$

$$\Rightarrow I\ddot{X}+M^{-1}KX=0$$

$$\Rightarrow I\ddot{X}+AX=0 \quad (20)$$

In equation (20), A is the constant matrix dependent upon $M^{-1}$ and K.

For harmonic motion, $\ddot{X}=-\lambda X$, so that the above equations (20) may be re-written as follows:

$$\Rightarrow -I\lambda X+AX=0$$

$$\Rightarrow (A-I\lambda)X=0 \quad (21)$$

where $\lambda$ is a matrix of the roots of any equation in matrix form. The characteristic equation of the system is then given by the following equation:

$$A-I\lambda=0 \quad (22)$$

The roots $\lambda_i$ of the above equation are the eigenvalues, and the corresponding frequencies in radians are given by the following equation:

$$\lambda_i = \omega_i^2 \quad (23)$$

Turbine blades undergo cyclic loading causing structural deterioration which can lead to failure. It is important to know how much damage has taken place at any particular point in time in order to monitor the conditions or health of the blade and to avoid any catastrophic failure of the blades. Several studies look at damage at a given time during the operational history of the structure. This analysis is diagnostic in nature and involves detection, location, and isolation of damage from a set of measured variables. On the other hand, prognostication involves predicting the temporal evolution of the structural or vibration characteristics of the system under study and is important for prediction of failure due to operational deterioration.

The stiffness of the turbine blade is gradually reduced with crack growth, and stiffness is related to the vibration characteristics of the blade. The decreased frequency shows that stiffness of the blade is decreasing and thus serves as a damage indicator for monitoring crack growth in the blade. Some studies have modeled turbine blades as rotating Timoshenko beams with twists and tapers. Also, some studies have addressed damage in such beams using vibration characteristics.

However, these studies typically have addressed damage at a given point in time during the operational history of the turbine blade and have not looked at the effect of damage growth on the vibration characteristics. Turbine blades undergo cyclic loading. This loading is time dependent and causes deterioration of the turbine blades. To avoid catastrophic failures of the turbine blades, the amount of damage as a function of time should also be determined and used to predict the remaining useful life of the turbine blade so that it can be optimally replaced before failure.

To study the structural behavior of the damage beam, it is beneficial to integrate a damage model into a finite element analysis. A number of damage models can be used for predicting damage growth due to fatigue. A damage model based on continuum damage mechanics (CDM) for low cycle fatigue damage analysis is useful. Low cycle fatigue occurs after a relatively low number of cycles (typically<10,000) of high stress amplitude. The CDM models are easier to include in a finite element analysis, and the finite element analysis and the damage growth analysis can be effectively decoupled.

The turbine blade is modeled as a tapered, twisted, and rotating Timoshenko beam. The geometry of this blade is discussed above in relations to FIGS. 1(a)-(d). The total strain energy U of the beam element 10 of length l due to bending and shear deformation including rotary inertia and rotation effects is given by equation (7). The quantities $P(z)$, $p_w(z)$, and $p_v(z)$ are given by the following equations:

$$P(z) = \frac{\rho A \Omega^2}{g}\left[\left(eL+\frac{1}{2}L^2-ez_e-\frac{1}{2}z_e^2\right)-(e+z_e)z-\frac{1}{2}z^2\right] \quad (24)$$

$$p_w(z) = \frac{\rho A \Omega^2}{g}(w_b+w_s) \quad (25)$$

$$p_v(z) = \frac{\rho A \Omega^2}{g}(v_b+v_s) \quad (26)$$

The kinetic energy T of the blade including the effect of shear deformation and rotary inertia is given by equation (11) and the deformations can be discretized in terms of shape functions. For the out-of-plane and in-plane bending $w_b$ and $v_b$ and shear deformations $w_s$ and $v_s$, cubic polynomials are used. These polynomials are given by equations (3)-(6).

Using the energy expressions and the finite element discretization, the stiffness and mass matrices are calculated. After assembling these matrices and applying the cantilever boundary conditions as discussed above, the following equation is obtained:

$$([K]-\omega^2[M])U=0 \quad (27)$$

Equation (27) is a re-written form of equation (21).

As discussed above, a damage model based on continuum damage mechanics (CDM) for low cycle fatigue damage analysis is useful. Such applications do not require detailed models of crack growth using facture mechanics. Instead, they are based on the continuum damage variable D that can be defined according to the following equation:

$$D = 1-\frac{E}{E_0} \quad (28)$$

where $E_0$ is the initial Young's modulus of the material and E is the value of the Young's modulus at a given time. For undamaged material, $E=E_0$ and D=0. For completely damaged material, E=0 and D=1. For prognostics, the path of damage growth as it evolves from D=0 to D=1 and the effect of such damage growth or damage indicators, such as frequencies and mode shapes, are of interest. Continuum damage mechanics models are phenomenological, are typically derived from experimental data, and provide the functional relationship of D(t). For fatigue problems, t=N where N is the number of cycles.

A useful damage model is given by the following equation:

$$D = 1-(1-D_0)\left(1-\frac{N}{N_f}\right)^{N_f \alpha} \quad (29)$$

The three parameters in this model are $D_0$, $N_f$ and $N_f \alpha$.

The parameters $D_0$, $N_f$ and $N_f \alpha$ can be determined from experiments. The following gives low strain, moderate strain, and high strain examples.

For low strain ±0.35 per cycle, and for 6230 cycles ($N_f$) to produce fatigue cracks resulting in failure, the parameters $D_0$, $N_f$ and $N_f \alpha$ may be 0.094, 6230, and 0.058, respectively. By inserting these values into equation (29), the following damage growth prediction model results:

$$D(N) = 1 - 0.906\left(1 - \frac{N}{6230}\right)^{0.058} \quad (30)$$

For moderate strain ±0.5 per cycle, and for 1950 cycles ($N_f$) to produce fatigue cracks resulting in failure, the parameters $D_0$, $N_f$, and $N_f\alpha$ may be 0.097, 1950, and 0.064, respectively. By inserting these values into equation (29), the following growth prediction model results:

$$D(N) = 1 - 0.903\left(1 - \frac{N}{1950}\right)^{0.064} \quad (31)$$

For high strain ±0.70 per cycle, and for 844 cycles ($N_f$) to produce fatigue cracks resulting in failure, the parameters $D_0$, $N_f$, and $N_f\alpha$ may be 0.077, 844, and 0.113, respectively. By inserting these values into equation (29), the following growth prediction model results:

$$D(N) = 1 - 0.923\left(1 - \frac{N}{844}\right)^{0.113} \quad (32)$$

Figure 2:
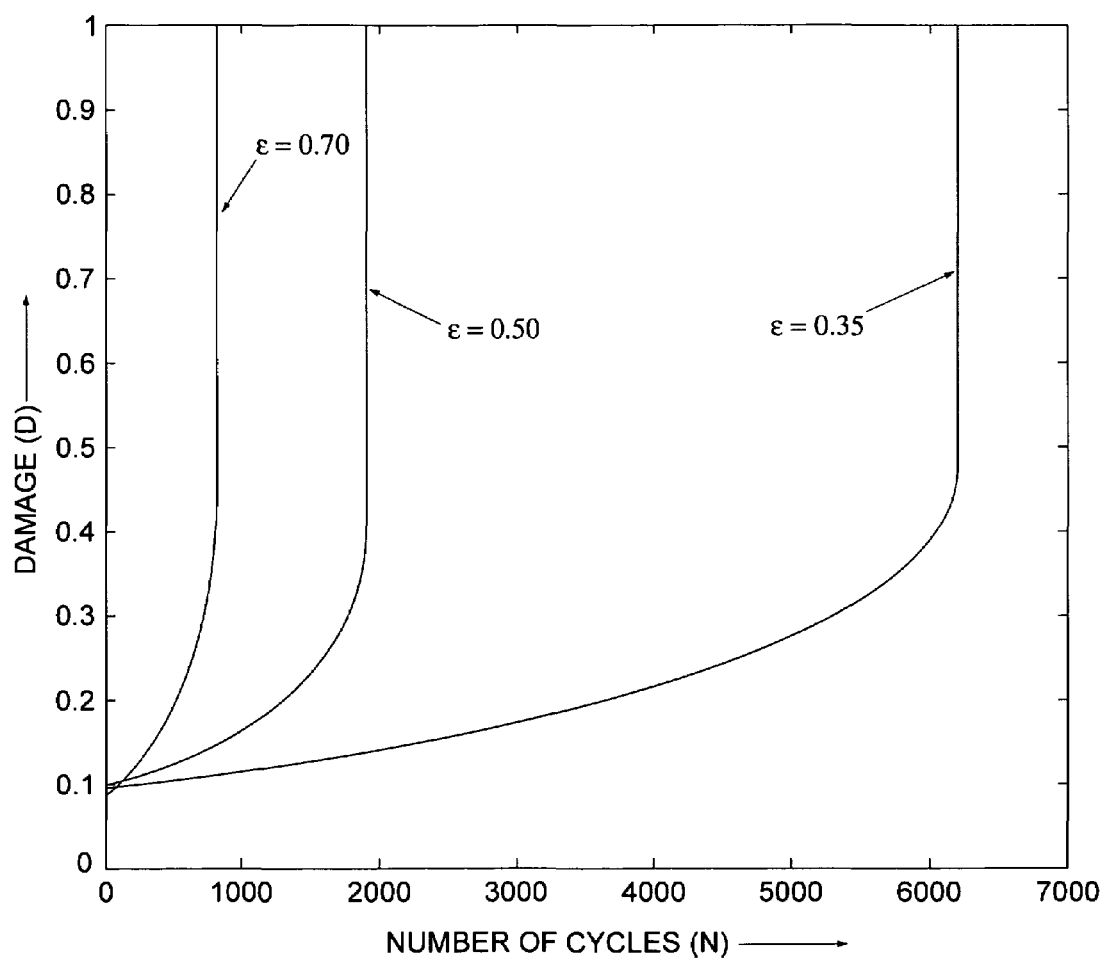
FIG. 2 illustrates damage as a function of cycles N based on low strain, moderate strain, and high strain damage models.

In all three cases, D is the damage that occurs in a structure as a function of N cycles. The damage based on each of these models as a function of cycles N is shown in FIG. 2. The plots shown in FIG. 2 show that D varies quickly at the early and last stages of cycling, and varies slowly in the middle stage of cycling from 10% to 80% of the total cycles, which is characteristic of low cycle fatigue (LCF) damage. High strain leads to faster failure of the material.

The stiffness (EA) of the beam and the fatigue element as a function of the number of cycles is related according to the following equation:

$$D(N) = 1 - \frac{E}{E_0} \quad (33)$$

Combining equations (30) and (33) produces the following equation for the low strain model:

$$E(N) = 0.906\left(1 - \frac{N}{6230}\right)^{0.058} E_0 \quad (34)$$

Combining equations (31) and (33) produces the following equation for the moderate strain model:

$$E(N) = 0.903\left(1 - \frac{N}{1950}\right)^{0.064} E_0 \quad (35)$$

Combining equations (32) and (33) produces the following equation for the high strain model:

$$E(N) = 0.923\left(1 - \frac{N}{844}\right)^{0.113} E_0 \quad (36)$$

Accordingly, given the above analysis, failure of a turbine blade, or indeed any vibrating beam, can be predicted by comparing its frequency of vibration to a predetermined frequency threshold or set of frequency thresholds. When the natural frequency of vibration of the blade falls to the predetermined frequency threshold, it may be determined that failure of the blade is imminent and that the blade should be replaced. This predetermined frequency threshold may be set, for example, at the frequency ω where $N/N_f=0.9$.

Figure 3:
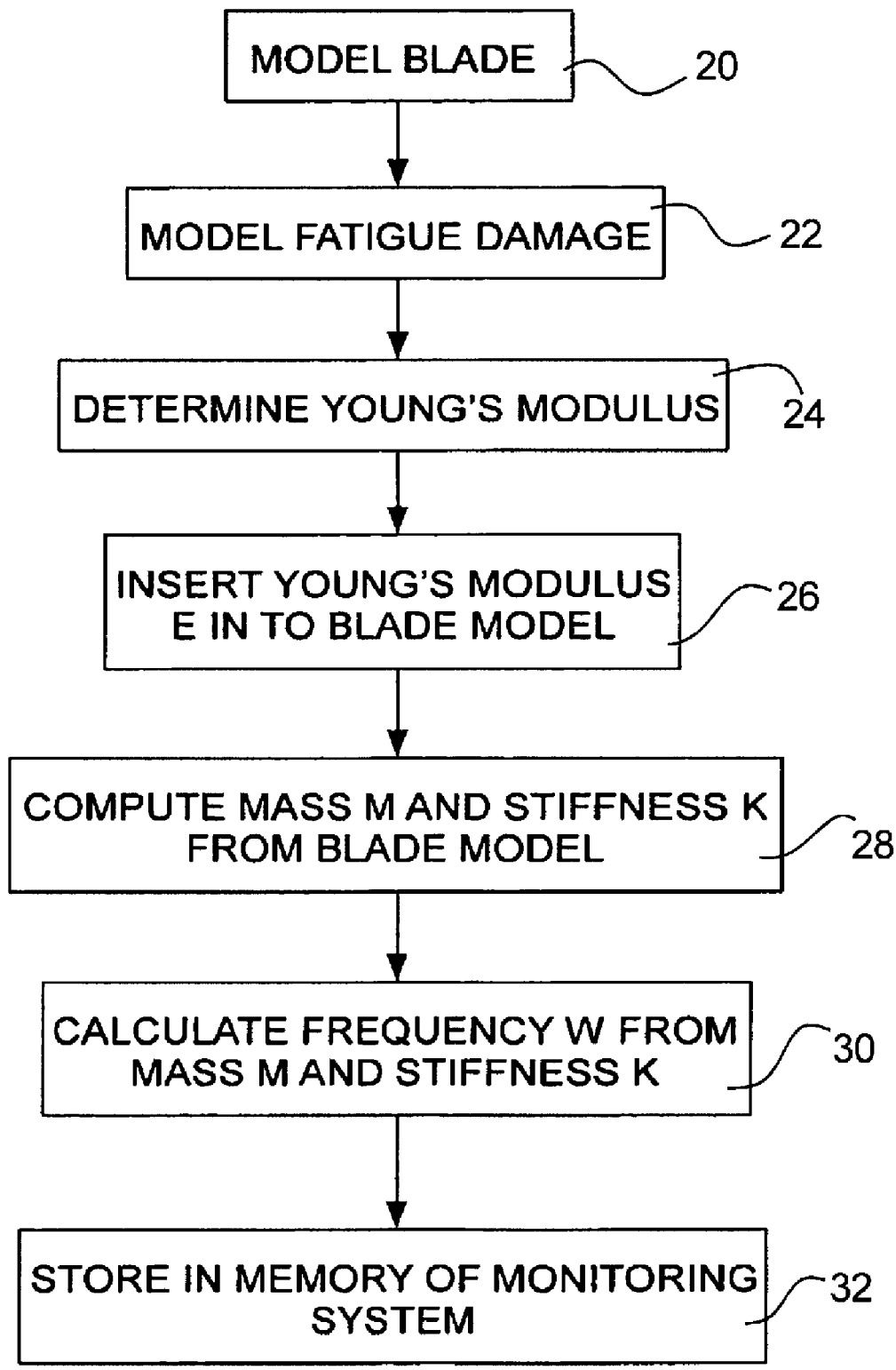
FIG. 3 illustrates a procedure for determining a predetermined frequency threshold that is used to indicate the point at which a blade should be replaced.

The predetermined frequency threshold may be determined in accordance with the procedure shown in FIG. 3. At 20, the blade is modeled using any suitable model such as a finite element model. More specifically, and as discussed above, the blade may be modeled as a tapered, twisted, and rotating Timoshenko beam. For this purpose, equations (7)-(14), (24), (25), and (26) can be used for the model. Further, the boundary conditions of equation (16) apply because the blade has a clamped end, i.e., the blade is a cantilever beam.

At 22, the damage fatigue of the blade is modeled using any suitable model such as the model based on continuum damage mechanics (CDM) for low cycle fatigue damage. Specifically, as discussed above, equations (28)-(32) can be used for modeling the fatigue damage of the blade according to multiple operating conditions such as a high strain condition, a moderate strain condition, and a low strain condition. The specific condition may dependent, for example, upon the particular application for the system described herein.

At 24, Young's modulus E(N) is then determined from the damage fatigue model using equations (33)-(36) according to one or more of the multiple operating conditions such as the high strain condition, the moderate strain condition, and the low strain condition.

At 26, the appropriate Young's modulus is inserted into the blade model determined at 20 and, at 28, the stiffness matrix K and the mass matrix M are computed, in the manner described above, from the blade model as modified at 26 by the Young's modulus determined at 24.

Figures 4, 5:
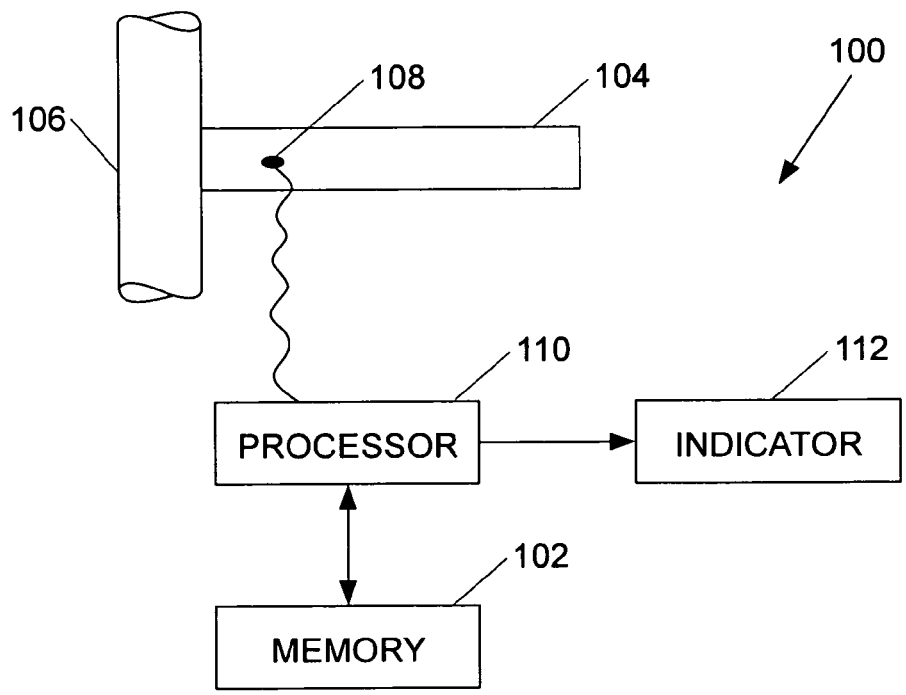
FIG. 4 is an example of a table relating the vibration frequency of a blade to its fatigue damage; and, FIG. 5 illustrates a system that determines when a turbine blade is in need of replacement.

The stiffness matrix K and the mass matrix M, which are computed at 28 and which are associated with a particular one of the operating conditions, are used at 30 to calculate the frequency of vibration of the blade as a function of fatigue. FIG. 4 is an example of a table for a particular one of the operating conditions that could result from this calculation, where $N/N_f$ represents the degree of fatigue of the blade and ω is the vibration frequency of the blade corresponding to selected values of $N/N_f$. The frequency ω typically decreases as the fatigue of the blade increases. A frequency ω, such as $ω_5$, can be chosen as the predetermined frequency threshold based on the amount of damage fatigue that can be tolerated in the blade.

At 32, the predetermined frequency threshold determined at 30 is stored in a memory 102 of a system 100 that monitors and predicts failure of a turbine blade.

The procedure of FIG. 3 can be implemented by way of a computer. In this case, the procedure of FIG. 3 can be viewed as a flow chart of a program executing on such a computer.

FIG. 5 illustrates the system 100 for monitoring and predicting failure of a turbine blade 104 that is supported by a rotating shaft 106. As is typical of turbine blades, the turbine blade 104 may be both twisted and tapered. A sensor 108 of the system 100 is provided to continuously or periodically sense the frequency of vibration of the turbine blade 104 during its use. The sensor 108 may be of any suitable type wholly mounted in the turbine blade 104, partially mounted on the turbine blade 104 and partially mounted on a static structure near the turbine blade 104, or wholly mounted on the static structure. The sensor 108, for example, may be a strain gauge, an accelerometer, etc.

A processor 110, such as a computer, continuously or periodically reads the frequency of vibration output of the sensor 108 and compares this frequency of vibration output with the predetermined frequency threshold stored in the memory 102. When the frequency of vibration output from the sensor 108 traverses the predetermined frequency threshold stored in the memory 102 thereby indicating fatigue damage sufficient to warrant replacement of the turbine blade 104, the processor 110 controls an indicator 112 such as a visual display, and/or an audio display, and/or an alarm, and/or an audible alert, etc. in order to provide notice that the turbine blade should be replaced. There are many sensors available in the literature which can be used to sense the frequency of vibration of the turbine blade 104 during its use.

If desired, the operating condition (low strain, moderate strain, high strain) of the turbine blade can be measured and this condition measurement can be combined with the vibration frequency measurement in order to determine fatigue damage.

Certain modifications of the present invention have been discussed above. Other modifications of the present invention will occur to those practicing in the art of the present invention. For example, as described above, the processor 110 compares the frequency of vibration output of the sensor 108 with the predetermined frequency threshold stored in the memory 102 and provides an indication of predetermined blade damage on the indicator 112 when the frequency of vibration output from the sensor 108 traverses the predetermined frequency threshold stored in the memory 102. Additionally or alternatively, the processor 110 may use the indicator 112 to provide trend information regarding the growth of fatigue damage of the turbine blade 104. In this case, the memory 102 may be arranged to additionally or alternatively store the type of trend data shown in FIG. 4. Thus, the processor 110 monitors the vibration frequency of the turbine blade 104 and provides an output by way of the indicator 112 to indicate the change in fatigue damage over time.

Moreover, the models discussed above will vary somewhat dependent upon the particular point along the turbine blade (the root of the turbine blade which is the point where it is clamped to the turbine wheel or shaft, the outboard end of the turbine blade, or at some intermediate point along the length of the turbine blade) from which the experimental data is derived. Therefore, the data stored in the memory 102 will relate to this particular point along the length of the turbine blade 104. This point is where the sensor 108 should be located. The sensor need not be placed at the location at which damage occurs in order to determine that the vibrating structure needs replacement.

Further, it is possible to use several tables such as shown in FIG. 4, where each table is related to a corresponding point along the length of the turbine blade 104, and to provide a sensor such as the sensor 108 to sense the vibration frequency of the turbine blade 104 at each of these points. The outputs from these multiple sensors can be blended in order to detect the need for blade replacement.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A system for indicating a need for replacement of a vibrating structure comprising:
    a sensor arranged to sense a frequency of vibration of the vibrating structure;
    an indicator that is controlled to provide an indication of the need for replacement of the vibrating structure; and,
    a processor that compares the sensed frequency of vibration of the vibrating structure to a reference frequency that relates the vibration frequency of the vibrating structure to fatigue damage of the vibrating structure and controls the indicator when the sensed frequency compares unfavorably with the reference frequency.

2. The system of claim 1 wherein the vibrating structure comprises a turbine blade.

3. The system of claim 1 further comprising a memory that stores the reference frequency.

4. The system of claim 1 wherein the vibrating structure comprises a turbine blade, and wherein the system further comprises a memory that stores the reference frequency.

5. A method comprising:
    generating a model of a vibrating structure;
    generating a fatigue damage model for the vibrating structure;
    modifying the model of the vibrating structure based on the fatigue damage model;
    determining from the modified model at least one frequency of vibration that corresponds to a predetermined amount of fatigue damage; and,
    storing the at least one frequency of vibration in a memory of a system to be used to provide a notification of when the vibrating structure should be replaced.

6. The method of claim 5 wherein the modifying of the model of the vibrating structure based on the fatigue damage model comprises:
    determining Young's modulus from the fatigue damage model; and,
    inserting the Young's modulus into the blade model.

7. The method of claim 5 wherein the determining from the modified model of at least one frequency of vibration that corresponds to a predetermined amount of fatigue damage comprises:
    computing a stiffness and a mass from the modified model; and,
    determining the at least one frequency of vibration from the stiffness and the mass.

8. The method of claim 7 wherein the modifying of the model of the vibrating structure based on the fatigue damage model comprises:
    determining Young's modulus from the fatigue damage model; and,
    inserting the Young's modulus into the blade model.

9. The method of claim 5 wherein the vibrating structure comprises a turbine blade.

10. The method of claim 9 wherein the modifying of the model of the vibrating structure based on the fatigue damage model comprises:
    determining Young's modulus from the fatigue damage model; and,
    inserting the Young's modulus into the blade model.

11. The method of claim 9 wherein the determining from the modified model of at least one frequency of vibration that corresponds to a predetermined amount of fatigue damage comprises:

computing a stiffness and a mass from the modified model; and, determining the at least one frequency of vibration from the stiffness and the mass.

12. The method of claim 11 wherein the modifying of the model of the vibrating structure based on the fatigue damage model comprises:

determining Young's modulus from the fatigue damage model; and, inserting the Young's modulus into the blade model.

13. A computer implemented method comprising:

generating a model of a vibrating structure;

generating a fatigue damage model for the vibrating structure;

modifying the model of the vibrating structure based on the fatigue damage model; and, determining from the modified model at least one frequency of vibration that corresponds to a predetermined amount of fatigue damage.

14. The method of claim 13 wherein the modifying of the model of the vibrating structure based on the fatigue damage model comprises:

determining Young's modulus from the fatigue damage model; and, inserting the Young's modulus into the blade model.

15. The method of claim 13 wherein the determining from the modified model of at least one frequency of vibration that corresponds to a predetermined amount of fatigue damage comprises:

computing a stiffness and a mass from the modified model; and, determining the at least one frequency of vibration from the stiffness and the mass.

16. The method of claim 5 wherein the modifying of the model of the vibrating structure based on the fatigue damage model comprises:

determining Young's modulus from the fatigue damage model; and, inserting the Young's modulus into the blade model.

17. The method of claim 13 wherein the vibrating structure comprises a turbine blade.

18. The method of claim 17 wherein the modifying of the model of the vibrating structure based on the fatigue damage model comprises:

determining Young's modulus from the fatigue damage model; and, inserting the Young's modulus into the blade model.

19. The method of claim 17 wherein the determining from the modified model of at least one frequency of vibration that corresponds to a predetermined amount of fatigue damage comprises:

computing a stiffness and a mass from the modified model; and, determining the at least one frequency of vibration from the stiffness and the mass.

20. The method of claim 19 wherein the modifying of the model of the vibrating structure based on the fatigue damage model comprises:

determining Young's modulus from the fatigue damage model; and, inserting the Young's modulus into the blade model.

* * * * *